United States Patent
Yasuda

(10) Patent No.: US 9,494,946 B2
(45) Date of Patent: Nov. 15, 2016

(54) FLOW RATE CONTROL DEVICE

(71) Applicant: HORIBA STEC, Co., Ltd., Kyoto-shi, Kyoto (JP)

(72) Inventor: Tadahiro Yasuda, Kyoto-shi (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 332 days.

(21) Appl. No.: 13/960,666

(22) Filed: Aug. 6, 2013

(65) Prior Publication Data

US 2014/0034164 A1 Feb. 6, 2014

(30) Foreign Application Priority Data

Aug. 6, 2012 (JP) ................................. 2012-174478

(51) Int. Cl.
  *F16L 37/00* (2006.01)
  *G05D 7/06* (2006.01)

(52) U.S. Cl.
  CPC .......... *G05D 7/0617* (2013.01); *G05D 7/0652* (2013.01); *Y10T 137/87265* (2015.04)

(58) Field of Classification Search
  CPC ................ Y10T 137/87265; Y10T 137/7759; Y10T 137/87507; G05D 7/0652; G05D 7/0617
  USPC .............................. 137/599.13, 599.09, 884
  See application file for complete search history.

(56) References Cited

U.S. PATENT DOCUMENTS

| | | | | |
|---|---|---|---|---|
| 3,327,760 A * | 6/1967 | Crawford, Jr. | ................. | 137/351 |
| 4,030,523 A * | 6/1977 | Cram et al. | ............... | 137/599.07 |
| 4,425,930 A * | 1/1984 | Kruto | ................................. | 137/1 |
| 4,670,138 A * | 6/1987 | Yunoki | ......................... | 210/141 |
| 5,950,668 A * | 9/1999 | Baumann | .................... | 137/487.5 |
| 7,552,740 B2 * | 6/2009 | Kabu et al. | ........................ | 137/1 |
| 2005/0284529 A1* | 12/2005 | Iwabuchi | ....................... | 137/884 |
| 2010/0139775 A1* | 6/2010 | Ohmi et al. | ..................... | 137/12 |
| 2013/0087230 A1* | 4/2013 | Yasuda | .......................... | 137/597 |
| 2013/0269795 A1* | 10/2013 | Yasuda | .......................... | 137/488 |

FOREIGN PATENT DOCUMENTS

| | | | |
|---|---|---|---|
| JP | S57206831 | A | 12/1982 |
| JP | H06004139 | A | 1/1994 |
| JP | H09330128 | A | 12/1997 |

(Continued)

OTHER PUBLICATIONS

Japanese Patent Office, Office Action Issued in Japanese Patent Application No. 2012-174478, Dec. 10, 2015, 4 pages.

(Continued)

*Primary Examiner* — Jessica Cahill
(74) *Attorney, Agent, or Firm* — Alleman Hall McCoy Russell & Tuttle LLP

(57) ABSTRACT

The flow rate control device comprises a basal plate block wherein a single input port into which a fluid flows, a single output port from which the fluid flows out, two inflow channels whose proximal ends are connected to the input port and two outflow channels whose terminal ends are connected to the output port are formed, and two flow rate control units arranged on the basal plate block, and one of the flow rate control units is arranged between one of the inflow channels and one of the outflow channels, the other flow rate control unit is arranged between the other inflow channel and the other outflow channel, and each of the flow rate control units is configured to be capable of operating independently.

5 Claims, 9 Drawing Sheets

(56) References Cited

FOREIGN PATENT DOCUMENTS

| JP | H10214117 A | 8/1998 |
|---|---|---|
| JP | H11311355 A | 11/1999 |
| JP | 2000146051 A | 5/2000 |
| JP | 2003091322 A | 3/2003 |
| JP | 2003280745 A | 10/2003 |
| JP | 2004246825 A | 9/2004 |
| JP | 2006343883 A | 12/2006 |
| JP | 2011013819 A | 1/2011 |
| JP | 2011137487 A | 7/2011 |
| WO | 2011040270 A1 | 4/2011 |

OTHER PUBLICATIONS

Japanese Patent Office, Office Action Issued in Japanese Patent Application No. 2012-174478, Mar. 17, 2016, 5 pages.

* cited by examiner

FLOW RATE CONTROL DEVICE

FIELD OF THE ART

This invention relates to a flow rate control device that controls a flow rate of a material gas used in, for example, a semiconductor manufacturing process.

BACKGROUND ART

As shown in the patent document 1, a conventional flow rate control device is configured so that an input port, an output port, an internal flow channel are formed in a basal plate block and a flow rate sensor and a flow rate adjusting valve are arranged on the base plate block so as to control the flow rate of a fluid at a set value.

The flow rate control device 10 is connected to a device such as other sensor (S) or an open/close valve (V) through a connecting block (GP) as shown in FIG. 9 or piping so that a gas panel system 100 that supplies a plurality of gases to a semiconductor manufacturing chamber is formed.

If a size of each device is not unified, it is difficult for the gas panel system 100 to standardize the connecting block (GP) or the piping because a special connecting block (GP) or piping becomes necessary, and variance is easily generated during assembly. As a result, a horizontal size of the basal plate block 1 for the flow rate control device 10 used in the gas panel system 100 is standardized in principle.

PRIOR ART DOCUMENTS

Patent Document

Patent document 1: Japanese Unexamined Patent Application Publication No. 2006-343883

DISCLOSURE OF THE INVENTION

Problems to be Solved by the Invention

However, there is a problem that it is difficult to downsize the device or to improve the packaging density because the size of the basal plate block is standardized. The present claimed invention intends to solve all of the above-mentioned problems by arranging a plurality of flow rate control devices on the basal plate block wherein each flow rate control device functions independently.

Means to Solve the Problems

More specifically, the flow rate control device in accordance with this invention comprises a basal plate block wherein a single input port into which a fluid flows, a single output port from which the fluid flows out, two inflow channels each of which has a proximal end that is connected to the input port, and two outflow channels each of which has a terminal end that is connected to the output port are formed, and two flow rate control units are arranged on the basal plate block, wherein one of the flow rate control units is arranged between one of the inflow channels and one of the outflow channels, the other flow rate control unit is arranged between the other inflow channel and the other outflow channel, and each of the flow rate control units is configured to be capable of operating independently.

"Each of the flow rate control units is configured to be capable of operating independently" indicates that each of the flow rate control units receives a control signal and operates correspondingly.

In accordance with this arrangement, since two flow rate control units are provided for a basal plate block, it is possible to improve the packaging density of each component while downsizing the entire flow rate control device.

In addition, since one of the flow rate control units is arranged between one of the inflow channels and one of the outflow channels and the other flow rate control unit is arranged between the other inflow channel and the other outflow channel, flow channels are formed in parallel between the input port and the output port. Furthermore, since each of the flow rate control units is configured to be capable of operation independently, it is possible to conduct the flow rate control for each of the flow channels separately. As a result, it is possible to output the flow rate of the fluid output from the output port by a single flow rate control device with various flow rate ranges and various accuracies by changing a combination of the flow rate control modes of each of the flow rate control units.

In order to make it possible to conduct the flow rate control with high accuracy by operating only the flow rate control unit that is suitable for realizing the flow rate according to an amount of, for example, the set flow rate value, in the case where the flow rate of the fluid is controlled by one of the flow rate control units, it may be configured so that the fluid does not flow in the output port from the input port through the other flow rate control unit.

"The flow rate of the fluid is controlled" in this embodiment indicates a state that the flow rate is kept constant at a set flow rate value or the flow rate is changed from a certain amount to a desired set flow rate value, for example, in a state that the fluid flows in the inflow channel and the outflow channel. Conversely, the state that the flow channel is closed so as not to flow the fluid in a part of the flow rate control unit is a state that no flow rate control is conducted.

In order to make it possible to automatically determine the flow rate control unit that should conduct the flow rate control so as to control the flow rate with high accuracy over an entire broad flow rate control range without considering which flow rate control unit should conduct the flow rate control according to the set flow rate value that a user wants to attain, it is preferable that a flow rate control characteristic of each flow rate control unit differs, and further, comprises an operation unit decision part that determines which flow rate control unit conducts the flow rate control according to an input set flow rate value.

In accordance with this arrangement, in the case where one of the flow rate control units whose flow rate controllable range is wide so that it is possible to conduct the flow rate control with a predetermined resolution and the other flow rate control unit whose flow rate controllable range is narrow so that it is possible to conduct the flow rate control with a resolution higher than the predetermined resolution of the one of the flow rate control units, when the set flow rate value is bigger than a predetermined value, the operation unit decision part decides that the flow rate control is conducted by the one of the flow rate control units alone. Meanwhile, when the set flow rate value is smaller than the predetermined value and the flow rate of the fluid should be kept constant at a very small flow rate, the operation unit decision part decides that the flow rate control is conducted by the other flow rate control unit alone. As a result, since the flow rate control is conducted in a flow rate control range suitable for each of the flow rate control units on a constant basis, it is possible to maintain a high flow rate control accuracy over an entire range while enabling a broad flow rate controllable range.

A representative concrete embodiment for realizing the flow rate control at high accuracy in the broad range that is difficult for a single flow rate control unit comprises a flow rate control device including flow rate control units, wherein each of the flow rate control units comprises a flow rate control valve, a flow rate sensor and a valve control part that controls an open degree of the flow rate control valve so as to decrease a deviation between a measured flow rate value measured by the flow rate sensor and the input set flow rate value, a flow rate controllable range of each of the flow rate control units differs, and the operation unit decision part is configured to both determine the flow rate control unit whose flow rate controllable range includes the input set flow rate value and which conducts the flow rate control, and to fully close the flow rate control valve of the flow rate control unit that does not conduct the flow rate control.

In order to make it possible to increase a packaging density of the flow rate control unit and to enable downsizing while the flow rate control device of this invention is easily incorporated into a conventional gas panel system without using additional special connecting components by matching the size of the basal plate block with that of the standardized basal plate block of the conventional gas panel system, it is preferable that the basal plate block is a standardized basal plate block wherein a size in a short direction of a mounting surface generally in a rectangular shape on which the flow rate control units are mounted is set to be generally identical to an outer size of the pressure sensor whose pressure sensitive surface is mounted parallel to the mounting surface, each of the flow rate control units comprises a pressure sensor whose pressure sensitive surface is mounted vertically relative to the mounting surface respectively, and each of the pressure sensors is mounted on the mounting surface, in a parallel manner, side by side in the short direction.

Although only one flow rate control unit is mounted on a mounting surface of a conventional standardized basal plate block because only one pressure sensor is arranged due to a limitation of a size, two pressure sensors can be mounted on the mounting surface of the basal plate block of this invention whose specification is the same as that of the conventional basal plate block. As a result, it is possible to arrange two flow rate control units each of whose sensor is used independently on the mounting surface so that each flow rate control unit can function independently. In addition, since it is possible to arrange the flow rate control units that can conduct the flow rate control mutually independently in the same footprint as a conventional flow rate control device, a packaging density twice that of conventional flow rate control devices is achieved.

Effect of the Invention

In accordance with the flow rate control device of this invention, since two flow rate control units are arranged on a single basal plate block and the flow rate control function of each of the flow rate control unit can control flow rate independently, it is possible to improve the packaging density and to enable downsizing with ease. In addition, if the present claimed invention is applied to the basal plate block whose size is standardized and that is used in a conventional gas panel system, it is possible to improve the flow rate control capability. In addition, in the case of downsizing, it is possible to replace a conventional flow rate control device by the flow rate control device of this invention with ease while the connecting block that constitutes the conventional gas panel system is continuously used as it is. More specifically, since the flow rate control device consists of the base plate block of a standardized size, it is possible to improve the performance of the gas panel system while easing updating of facilities by standardizing the horizontal size thereof.

BRIEF DESCRIPTION OF THE DRAWINGS

FIG. 5(*b*) is a perspective view showing an example of a conventional flow rate control device using a standardized basal plate block.

FIG. 7(*b*) is a schematic view of a diagram showing a configuration of a basal plate block element in accordance with this embodiment of this invention.

FIG. 7(*c*) is a schematic view of a diagram showing a configuration of adaptor blocks in accordance with this embodiment of this invention.

DESCRIPTION OF REFERENCE CHARACTERS

Figure 1:
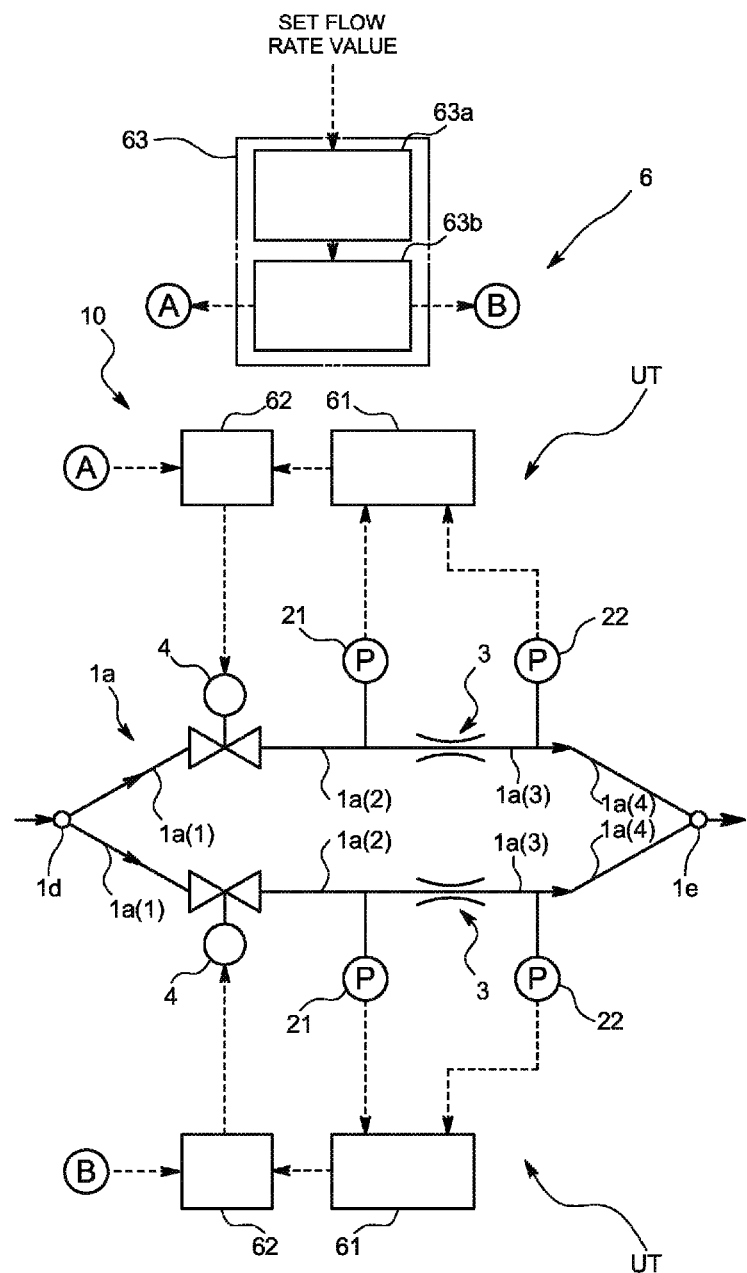
FIG. 1 is a schematic fluid circuit diagram of a flow rate control device in accordance with one embodiment of this invention.

100: gas panel system
UT: flow rate control unit
1: basal plate block
1*d*: input port
1*e*: output port
1*a* (1): inflow channel
1*a* (4): outflow channel
10: flow rate control device
21, 22: pressure sensor
21P, 22P: pressure-sensitive surface
61: flow rate calculation part
62: valve control part
63: operation unit decision part

BEST MODES OF EMBODYING THE INVENTION

One embodiment of this invention will be explained with reference to drawings.

A flow rate control device 10 in accordance with this embodiment is used for, for example, a semiconductor manufacturing system, and constitutes a gas panel system 100 that supplies various gases at a predetermined flow rate into a chamber of the semiconductor manufacturing system by being connected to an open/close valve (V) or a device such as the other flow rate control device 10 through a connection block (GP) or piping.

The flow rate control device 10 has the same size as a standardized horizontal size of the above mentioned gas panel system 100 and is configured to be easily replaced by the flow rate control device 10 of the conventional gas panel system 100 and comprises the basal plate block 1 whose size is the same as that of the conventional standardized basal plate block.

As shown in an overall fluid circuit diagram in FIG. 1, the flow rate control device 10 forms two parallel flow channels between a single input port 1d into which a fluid flows and a single output port 1c out from which the fluid flows by combining the internal flow channel 1a formed in the basal plate block 1 with various fluid control devices, and the flow channels share the input port 1d and the output port 1e.

A flow rate control unit (UT) that can control the flow rate in each of the flow channels independently is formed in each of the flow channels one by one respectively. Each part will be explained.

First, a configuration mainly of hardware of the flow rate control device 10 will be described in detail.

Figure 2:
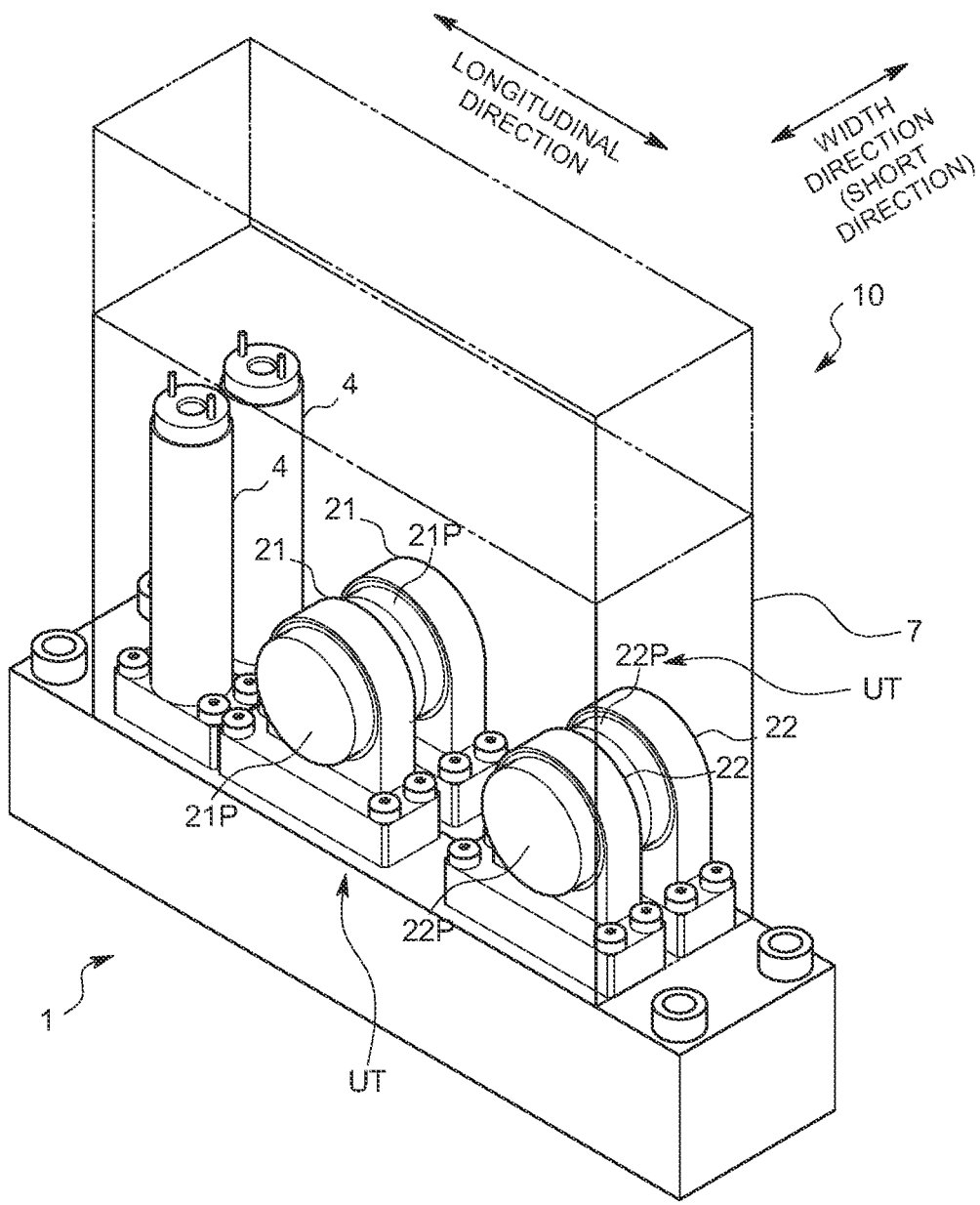
FIG. 2 is a schematic perspective view of the flow rate control device in accordance with this embodiment.
Figure 3:
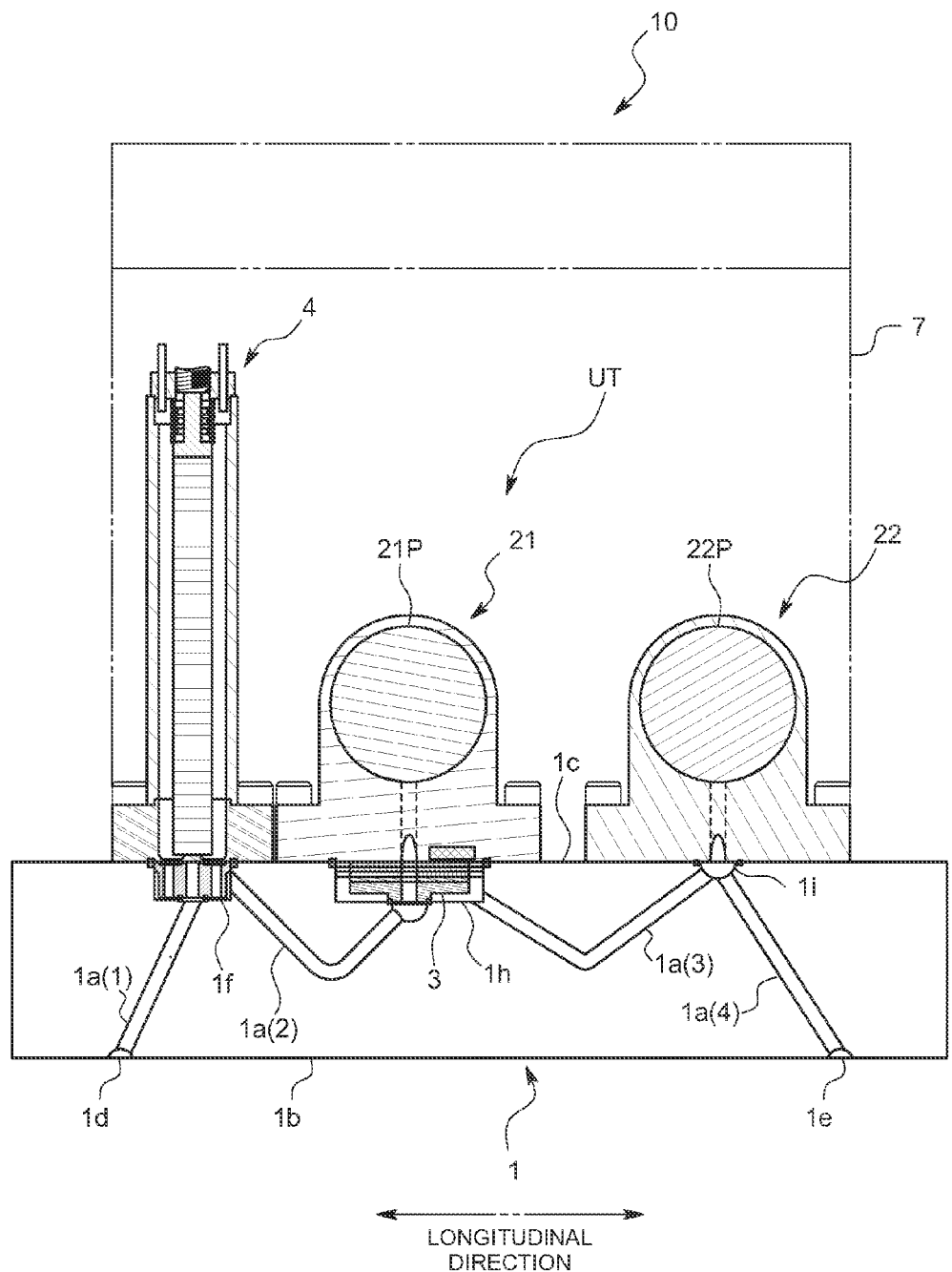
FIG. 3 is a schematic cross-sectional view of the flow rate control device in accordance with this embodiment.

As shown in the fluid circuit diagram in FIG. 1, a perspective view in FIG. 2 and a cross-sectional view taken in the longitudinal direction crossing the flow rate control unit (UT) in FIG. 3, the flow rate control device 10 comprises the basal plate block 1 generally in a rectangular shape having an internal flow channel 1a where the fluid flows between the input port 1d and the output port 1e, two flow rate control units (UT) arranged in two parallel rows in the longitudinal direction on a mounting surface 1c of the basal plate block 1, an information processing circuit 6 that controls each of the flow rate control units (UT) and a single casing 7 that covers an outer side of each flow rate control unit (UT).

Figure 4:
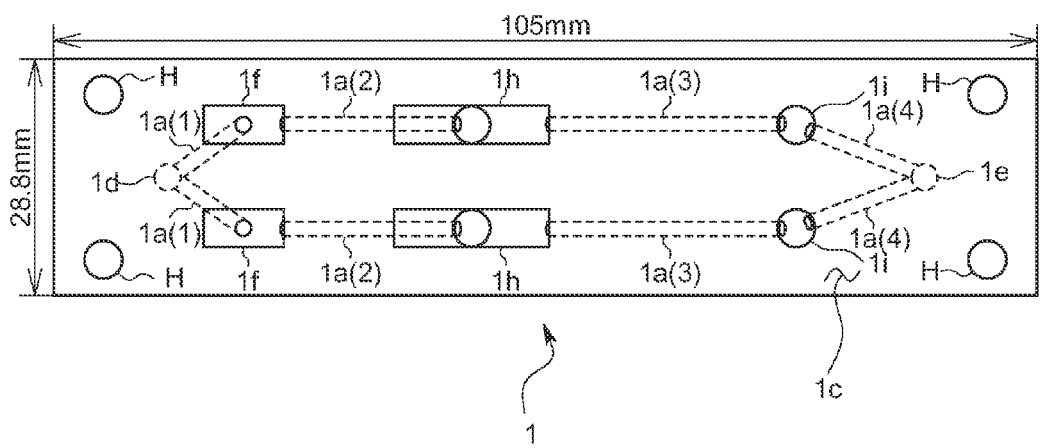
FIG. 4 is a schematic view showing a mounting surface and internal flow channel configuration of the flow rate control device in accordance with this embodiment.

As shown in FIG. 2 through FIG. 4, the basal plate block 1 is made of, for example, a metal in an elongated rectangular shape. One surface that is parallel to a longitudinal direction of the basal plate block 1 is set as the mounting surface 1c, and components such as various fluid control devices are mounted on this mounting surface 1c alone. In addition, a surface opposite to the mounting surface 1c is a fixing surface 1b to fix the basal plate block 1 on a panel or the like. In this embodiment, the input port 1d of the internal flow channel 1a opens at one end part in the longitudinal direction of the fixing surface 1b, and the output port 1e of the internal flow channel 1a opens at the other end part of the fixing surface 1b. Nothing is mounted on the other two surfaces (hereinafter called as side surfaces) that are parallel to the longitudinal direction so as to make it possible to arrange a plurality of flow rate control devices 10 with the side surfaces of the basal plate blocks 1 tightly attached each other or near each other.

The internal flow channel 1a extends from one end part in the longitudinal direction of the basal plate block 1 to the other end part thereof. More concretely, viewed from a plane direction as being a vertical direction to the mounting surface 1c as shown in FIG. 4 (hereinafter also called as a plane view), the internal flow channel 1a is bifurcated between the input port 1d formed on a center of one end part of the fixing surface 1b and the output port 1e formed on a center of the other end part of the fixing surface 1b. Two inflow channels 1a (1) whose proximal end is connected to the input port 1d extend from the input port 1d toward the other end part side in a shape of a "V" character, and then each of an upstream side internal flow channel 1a (2) and a downstream side internal flow channel 1a (3) extend generally parallel to the longitudinal direction. And each of outflow channels 1a (4) extends from a terminal end of each downstream side internal flow channel 1a (3) and meets at the output port 1e in a shape of a "V" character. A direction perpendicular to the longitudinal direction is called a width direction (a short direction) viewed from the plane direction.

Each of the flow rate control units (UT) conducts flow rate control of, so called, a differential pressure type (a compression type), and comprises, as shown in FIG. 1 through FIG. 4, a flow rate control valve 4, a first pressure sensor 21, a laminar flow element 3 and a second pressure sensor 22 in this order from the upstream side. Each of the fluid control devices is mounted on the mounting surface 1c in two rows in the longitudinal direction. A structure that is in common to each flow rate control unit (UT) will be first explained.

Each of the flow rate control valves 4 is fittingly mounted in a concave part having a bottom 1f that opens in one end part on the mounting surface 1c as shown in FIG. 3, and connects the terminal end of the inflow channel 1a (1) extending from the input port 1d and a proximal end of the upstream side internal flow channel 1a (2) of the internal flow channel 1a. Each of the flow rate control valves 4 changes a gap in the concave part having the bottom 1f by changing an open degree of a valve body due to an applied voltage so that the flow rate is changed. More specifically, it is possible for each of the flow rate control valves 4 to change a state from that where the fluid completely stops flowing by closing the concave part having the bottom 1f to that where the fluid flows generally freely without any resistance by opening the concave part having the bottom 1f.

The laminar flow element 3 arranged in the internal flow channel 1a and a pair of the pressure sensors 21, 22 for measuring the pressure in an upstream side and a downstream side of the laminar flow element 3 are used as a device for measuring a fluid flowing in a channel. Each part will be explained.

The laminar flow element 3, which causes the fluid flowing inside to be in a state of laminar flow, is formed by laminating a plurality of rectangular thin plates, and fixing the rectangular thin plates to the mounting surface 1c, the rectangular thin plates being pushed by the first pressure sensor 21 from an upper side in a state of being fit into the concave part 1h formed in a center part of the mounting surface 1c. In this state wherein the laminar flow element 3 is fit into the concave part 1h, a part between the terminal end of the upstream side internal flow channel 1a (2) and the proximal end of the downstream side internal flow channel 1a (3) is connected so that the flow channel is connected. In addition, by mounting the second pressure sensor 22 on the mounting surface 1c, the terminal end of the downstream side internal flow channel 1a (3) and the proximal end of the outflow channel 1a (4) whose terminal end is the output port 1e are connected so that the flow channel is formed.

The first pressure sensor 21 and the second pressure sensor 22 each comprises a body member in a flat shape and a pressure sensitive surface 21P and 22P, respectively, incorporated into the body member. The flat body member, in other words, each of the pressure sensitive surface 21P, 22P respectively, is arranged to be vertical with respect to the mounting surface 1c of the basal plate block 1 along the longitudinal direction.

A different part of each flow rate control unit (UT) will be explained. A flow rate controllable range and the control resolution of each flow rate control unit (UT) are different. More specifically, the flow rate controllable range for one of the flow rate control units (UT) arranged in the upstream side in a plane view is set to 10-100% of the maximum flow rate that is necessary to be output from the output port 1e, and it is possible to control the flow rate at a predetermined accuracy within this range. On the other hand, the flow rate controllable range for the other flow rate control unit (UT) arranged in the lower side in a plane view is set 0.03~10% of the maximum flow rate. It is possible to control the flow rate within this range at the predetermined flow rate accuracy. In other words, the control resolution is made low at the wide flow rate controllable range corresponding to one of the flow rate control units (UT), and the control resolution is made high at the narrow flow rate controllable range corresponding to the other flow rate control unit (UT).

Next a size of the basal plate block 1 and a method of mounting the fluid control device constituting each of the flow rate control units (UT) will be described in further detail.

Figure 5A:
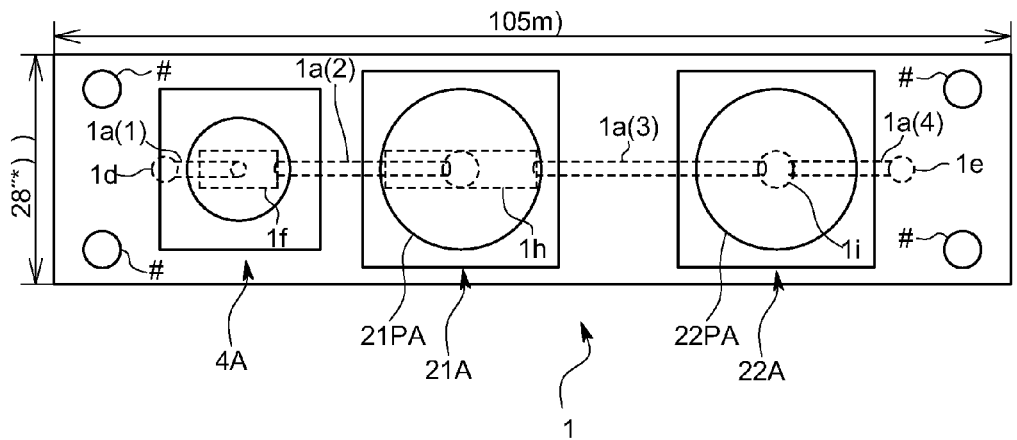
FIG. 5(*a*) is a schematic view showing an example of a conventional flow rate control device using a standardized basal plate block.
Figure 5B:
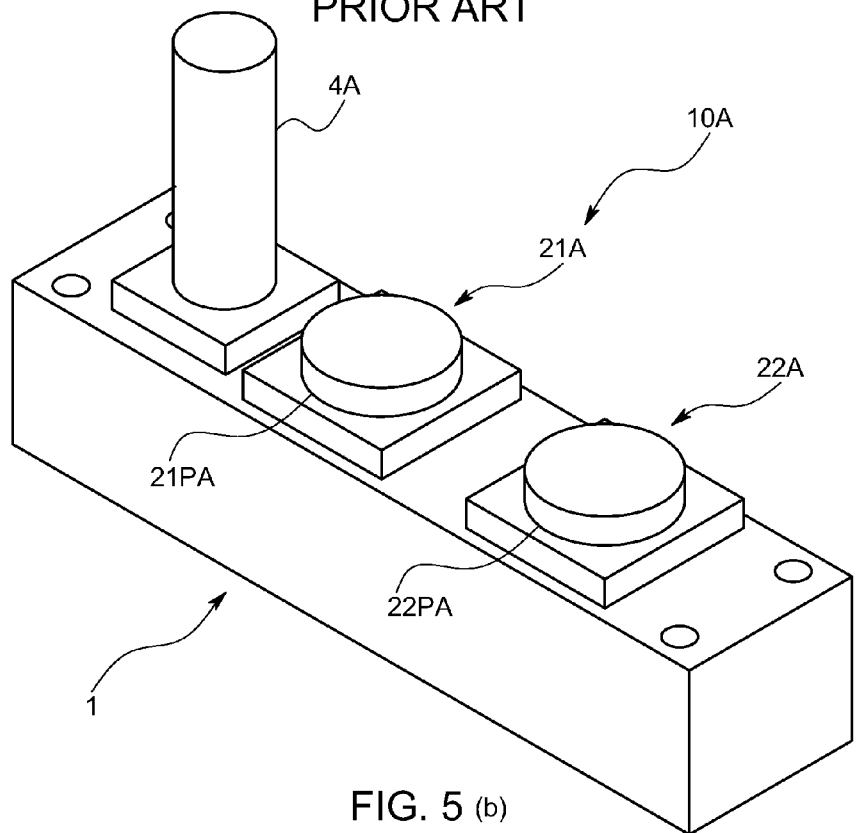

The basal plate block 1 has the same size as that of the conventional standardized one, and a length of the mounting surface 1c is, as shown in FIG. 4, 105 mm in the longitudinal direction and 28.8 mm in the width direction. Specifically, the length in the width direction is, as shown by the mounting surface 1c of the conventional basal plate block 1 in FIG. 5(a) and a perspective view of a conventional flow rate control device 10 in FIG. 5(b), set to be generally the same length as an outer size of the pressure sensor mounted in parallel on the mounting surface 1c where the pressure sensitive surfaces 21PA, 22PA are mounted. As is clear from FIGS. 5(a) and 5(b), for the conventional flow rate control device 10A it is not assumed that two pressure sensors are arranged in a line along the width direction, a single flow channel inner part, of which no branch is provided, is formed, and only a single flow rate control unit (UT) is used. Except for standardized components, in FIGS. 5(a) and 5(b), the suffix "A" is added to reference numerals of parts of the conventional flow rate device that are largely different from that of this embodiment, in a portion of the device.

In contrast, in the flow rate control device 10 of this embodiment, each of the pressure sensors is arranged in parallel with each other along the width direction on the mounting surface 1c by the use of the pressure sensors mounted on the mounting surface 1c with pressure sensitive surfaces 21P, 22P oriented vertically relative to the mounting surface 1c, wherein the mounting surface 1c has a conventional and standardized size. In addition, each entire flow rate control unit (UT) is mounted in parallel along the width direction of the mounting surface 1c by mounting two flow rate control valves 4 in parallel.

More specifically, in accordance with this embodiment, since two flow rate control units (UT) are arranged in the conventionally standardized area, it is possible to downsize the entire flow rate control device 10 by increasing a packaging density.

Next, controlling the flow rate and software of the flow rate control device 10 of this embodiment will be described in detail.

The information processing circuit 6 is housed in an upper part space of the casing 7 and comprises a CPU, a memory, an I/O channel, an A/D converter, a D/A converter and other analog and digital electric circuits. The information processing circuit 6 serves as at least a flow rate calculating part 61, a valve control part 62 and an operation unit decision part 63 by coordinating operation of the CPU and its peripheral devices according to programs stored in the memory.

First, the flow rate calculating part 61 and the valve control part 62 each of which is independently provided for each of the flow rate control units (UT) will be explained.

The flow rate calculating part 61 receives a signal of a pressure measurement from the first pressure sensor 21 and the second pressure sensor 22, and calculates a mass of the fluid flowing in the internal flow channel 1a and a volume flow rate based on the value of the received signal and a fluid resistance characteristic of the laminar flow element 3 previously stored. In other words, the flow rate sensor of a pressure type is configured utilizing the first pressure sensor 21, the laminar flow element 3, the second pressure sensor 22 and the flow rate calculating part 61.

On the other hand, the valve control part 62 applies a voltage to the flow rate control valve 4 by outputting the control signal thereto and conducts feedback control so as to adjust a measured flow rate value in the internal flow channel 1a calculated by the flow rate calculating part 61 to match a set flow rate value input by the operation unit decision part 63, to be described later. More specifically, the valve control part 62 controls the flow rate of the flowing fluid by controlling an open degree of the flow rate control valve 4 so as to decrease the deviation between the measured flow rate value and the set flow rate value. In addition, as an exceptional operation, in the case where a fully close command is input by the operation unit decision part 63, the valve control part 62 fully closes the flow rate control valve 4 so as not to allow fluid flow in the corresponding internal flow channel 1a regardless of the measured flow rate value output by the flow rate calculating part 61.

The operation unit decision part 63 receives the set flow rate value input by a user and decides which flow rate control unit (UT) is used to conduct flow rate control based on the input set flow rate value.

More concretely, the operation unit decision part 63 comprises a receiving part 63a that receives the set flow rate value and an operation control part 63b that outputs a control signal respectively to each of the flow rate control units (UT) according to the set flow rate value received by the receiving part 63a. More specifically, the operation control part 63b is configured both to decide that the flow rate control unit (UT) that includes the set flow rate value in the flow rate controllable range conducts the flow rate control and to fully close the flow rate control valve 4 of the flow rate control unit (UT) that does not conduct the flow rate control. For example, in the case where 50% of the maximum flow rate is input as the set input value, the operation control part 63b of the operation unit decision part 63 inputs the set input value to the control signal receiving part (indicated by "A" and "B" in FIG. 1) of the valve control part 62 of one of the flow rate control units (UT) located at the upper side of the flow rate control device 10 in a plane view, and inputs a fully closed command to the control signal receiving part of the valve control part 62 of the other flow rate control unit (UT) located at the lower side of the flow rate control device 10 in the plane view.

As a result, the fluid flows in the internal flow channel 1a located at the upper side of the flow rate control device in the plane view and the open degree of the flow rate control valve 4 located in at the upper side of the flow rate control device in the plane view is successively adjusted so as to attain the set flow rate value. Meanwhile, since the flow rate control valve 4 located at the lower side of the flow rate control device is fully closed, no fluid flows in the internal flow channel 1a located at the lower side of the flow rate control device in the plane view.

In other words, since the operation unit decision part 63 is configured to operate either one of the flow rate control units (UT) alone, each of the flow rate control units (UT) is operated independently and exclusively.

Conversely, in the case where a small set flow rate value such as, for example, 0.1% of the maximum flow rate is input by a user, the fully close command is input to one of the flow rate control units (UT) and no fluid flows in the internal flow channel 1a at the upper side of the flow rate control device 10 in the plane view, and the flow rate of the other flow rate control unit (UT) is controlled by the set flow rate value input to the valve control part 62 so that the fluid flows in the internal flow channel 1a located at the lower side of the flow rate control device 10 in the plane view.

In accordance with the flow rate control device 10 of this embodiment, since two flow rate control units (UT) are arranged both in parallel on the standardized single basal plate block 1 and are controllable independently, and the operation unit decision part 63 controls the flow rate only by the flow rate control unit (UT) whose set flow rate value is included in the flow rate controllable range, it is possible to widen the flow rate controllable range while maintaining the control accuracy of the flow rate.

For example, in the case where only one flow rate control unit (UT) is formed on the basal plate block 1 similar to the conventional flow rate control device, the range where the flow rate can be controlled reliably is only 10%~100% of the maximum flow rate. However, with the flow rate control device 10 of this embodiment, since it is possible to control the flow rate reliably even though the range is 0.03%~10% of the maximum flow rate as being the flow rate controllable range of the other flow rate control unit (UT), it is possible for the flow rate control device 10 to control the flow rate within a range between 0.03% and 100% of the maximum flow rate.

More specifically, it is possible for the flow rate control device 10 of this embodiment to widen the flow rate controllable range and to enable densification and downsizing while using a conventional basal plate block 1, which is difficult to change in size because of standardized specifications for connecting the basal plate block 1 with other components.

Next, a different embodiment of this invention will be explained with reference to a perspective view in FIG. 6 and a plane view in FIGS. 7(a), 7(b), and 7(c). The same components corresponding to the above-mentioned embodiment will be denoted by the same reference numbers.

Figure 6:
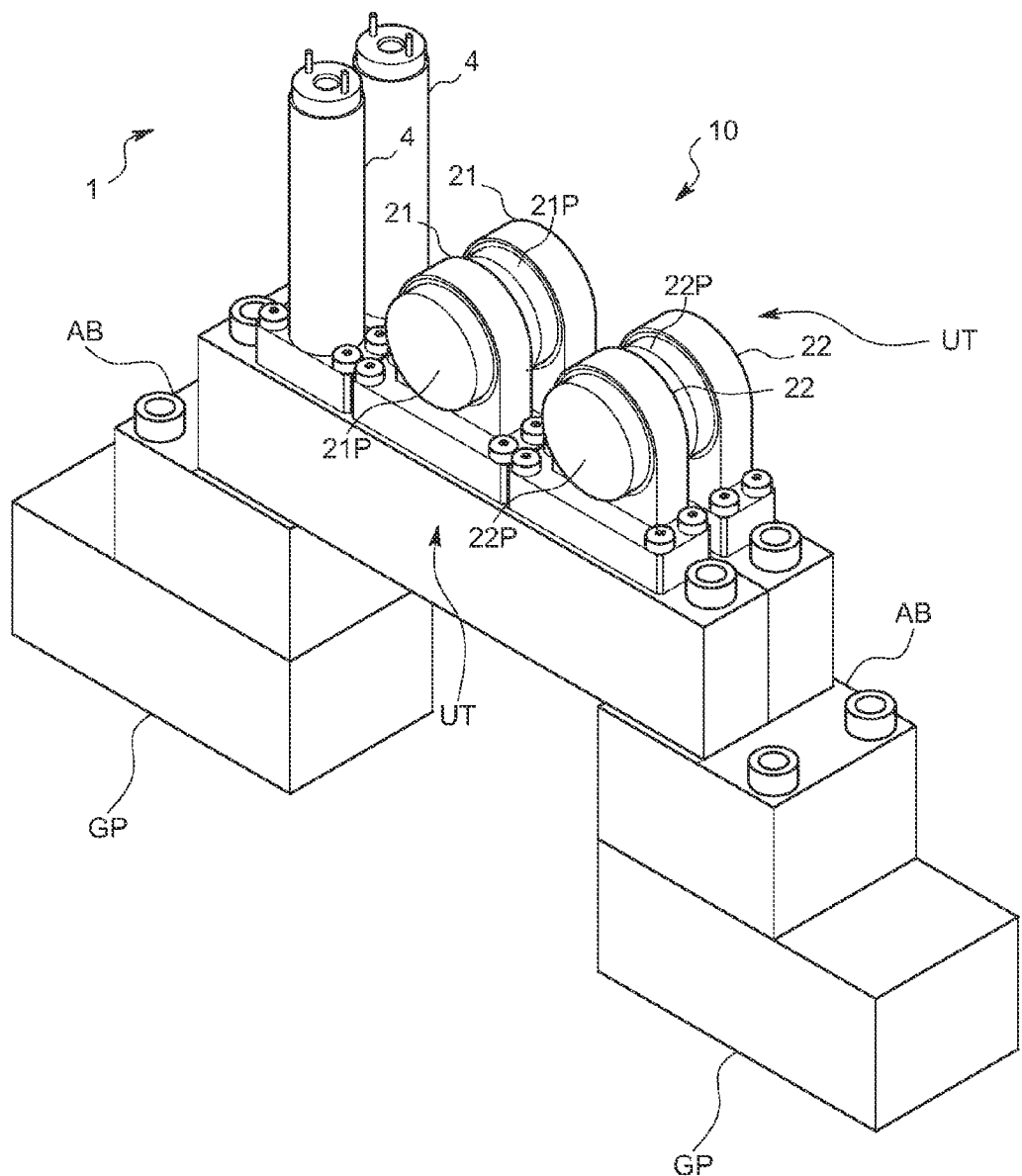
FIG. 6 is a schematic perspective view of a flow rate control device in accordance with another embodiment of this invention.
Figure 7:
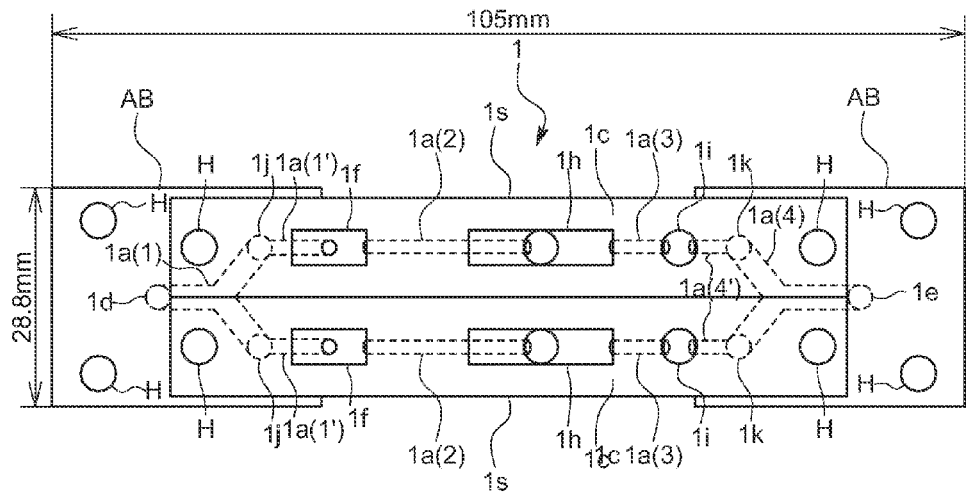
FIG. 7(*a*) is a schematic view of a diagram showing a configuration of a basal plate block in accordance with this embodiment of this invention.
Figure 7:
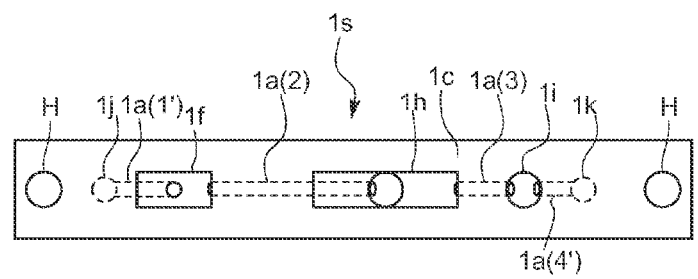
Figure 7:
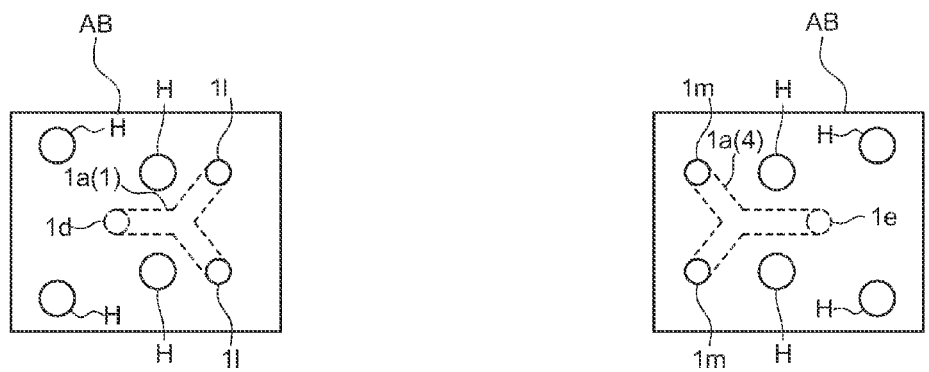

In the above-mentioned embodiment, the basal plate block 1 is formed by providing a process of drilling various holes into a single cuboid made of metal, however, the basal plate block 1 of this embodiment comprises two basal plate block elements 1s in a generally rectangular shape as shown in FIG. 6 and FIG. 7, and two adaptor blocks (AB) that connect the basal plate block elements 1s to each other at their adjacent side surfaces and that connect the basal plate block elements 1s and connecting blocks (GP), to constitute a gas panel system. An upper surface of each of the basal plate block elements 1s is a mounting surface 1c, and a flow rate control unit (UT) is mounted on the mounting surface 1c respectively.

Each part will be explained in detail.

An internal flow channel 1a having [DL1] bifurcation as shown in FIG. 7(a) and an internal flow channel 1a having no bifurcation as shown in 7(b) is formed inside of the basal plate block element 1s, and an inflow side connecting hole 1j and an outflow side connecting hole 1k, each of which is connected to the internal flow channel 1a of the adaptor block (AB), are formed on a surface opposed to the mounting surface 1c. An inflow side connecting flow channel 1a (1') that is connected to the inflow channel 1a (1) formed inside of the adaptor block (AB) is formed between the inflow side connecting hole 1j and the upstream side internal flow channel 1a (2), and an outflow side connecting flow channel 1a (4') is formed between the downstream side internal flow channel 1a (3) and the outflow side connecting hole 1k.

As shown in FIG. 7(c), each of the adaptor blocks (AB) is in a generally rectangular shape, and either of two fluid outflow bores 1l to be connected to each of the inflow side connecting hole 1j of the basal plate block element is or two fluid inflow bores 1m to be connected to each of the outflow side connecting holes 1k are formed in addition to a screw bore (H) connected with the basal plate block element 1s by means of a bolt. In addition, either of a single input port 1d into which the fluid flows from the connecting block (GP) and a single output port 1e from which the fluid passing the basal plate block element 1s is output to the connecting block (GP) is formed on a bottom surface of the adaptor block (AB).

More specifically, the inflow channel 1a (1) extends from the input port 1d, bifurcates halfway inside of one of the adaptor blocks (AB), and is connected to each of the fluid outflow bores 1l. In addition, an outflow channel 1a(4) is formed inside of the other adapter block (AB) wherein the internal flow channels extending from each of the fluid inflow bores 1m converge near the midpoint of the other adapter block (AB), and the converged flow channel is connected to the output port 1e.

In the case where two basal plate block elements 1s and two adaptor blocks (AB) are combined, the outer dimension (from a plane view) of the combined basal plate block elements and adaptor blocks is tailored to match the standard specification of the basal plate block 1, having a length in the longitudinal direction of 105 mm and a length in the width direction of 28.8 mm as shown in FIG. 7(a), and the input port 1d and the output port 1e are also positioned at the same position as in the above-mentioned embodiment.

As mentioned above, it is possible to form a fluid circuit that has the same size as that of the above-mentioned embodiment and that is equivalent to the fluid circuit shown in FIG. 1 if a single basal plate block 1 is provided by arranging a single flow rate control unit (UT) on the basal plate block element 1s and combining two basal plate block elements 1s utilizing two adaptor blocks (AB). More specifically, in this embodiment, it follows that the same effect as that of the above-mentioned embodiment can be produced and it becomes easy to provide processing of the internal flow channel 1a as compared with a case wherein each of the basal plate blocks 1 is formed by a single metal block.

In addition, the flow rate control device 10 of the above-mentioned embodiment shown in FIG. 2 and the flow rate control device 10 of this embodiment shown in FIG. 6 have the same planar size, and the height of the flow rate control device 10 of this embodiment is greater than the height of the flow rate control device shown in FIG. 2 by the height of the adaptor block (AB). In the case where not only the limitation in the footprint, but also the limitation in the height direction is severe in the semiconductor manufacturing process, the flow rate control device 10 of the above-mentioned embodiment is more preferable. The selection of which flow rate control device embodiment to use may also depend on cost or installation conditions.

Another embodiment will be explained.

In the above-mentioned embodiment, each of the flow rate control units controls the flow rate by the flow rate sensor of the differential pressure type (pressure type), however, the flow rate may be controlled by the use of the flow rate sensor of a thermal type instead of the flow rate sensor comprising, for example, the first pressure sensor, the laminar flow element and the second pressure sensor. In addition, a layout of each fluid device constituting the flow rate control device unit is not limited to the above-mentioned embodiments, and the flow rate control device may include the first pressure sensor, the laminar flow element, the second pressure sensor and the flow rate control valve arranged in this order. In the case of using the flow rate sensor of the thermal type, the flow rate control device may include the flow rate control valve and the thermal type flow rate sensor arranged in this order from the upstream side, or conversely the flow rate control device may include the thermal type flow rate sensor and the flow rate control valve arranged in this order from the upstream side.

In addition, a sonic nozzle may be used instead of the laminar flow element. In summary, the laminar flow element may be a fluid resistor element that causes a pressure change necessary for measuring a flow rate by each pressure sensor In the above-mentioned embodiment, two flow rate control units are arranged on the mounting surface of the basal plate block, however, three or more flow rate control units may be arranged to form parallel flow channels between the input port and the output port.

In addition, the flow rate control characteristic of each flow rate control unit may not be necessarily different, and a plurality of flow rate control units having generally the same flow rate control characteristic may be formed in parallel between the input port and the output port. In this case, it is acceptable as long as the flow rate control of each flow rate control unit can be conducted independently.

In the above-mentioned embodiment, the flow rate control is conducted by either one of the flow rate control units alone depending on the operation unit decision part so as to conduct an exclusive flow rate control, however, the flow rate control may be conducted simultaneously by both of the flow rate control units.

Concretely, instead of the operation unit decision part, the flow rate control device may comprise a set flow rate distribution part that distributes the input set flow rate value to each of the flow rate control units and that makes each of the flow rate control unit conduct the flow rate control simultaneously. For example, in the case where the set flow rate value of 50% of the maximum flow rate is input, the set flow rate distribution part inputs 30% of the maximum flow rate as the set flow rate value to one of the flow rate control units and inputs 20% of the maximum flow rate as the set flow rate value to the other flow rate control unit and distributes the flow rate so that a total of the flow rate output by two flow rate control units becomes the set flow rate value input by the user. The distribution ratio may be freely changed, and the above distribution ratio for a set flow rate value of 50% of the maximum flow rate is an example.

In addition, the set flow rate distribution part may distribute the set flow rate value to each of the flow rate control units by separating the set flow rate value into order of magnitude component parts. For example, the set flow rate distribution part may be configured so that a large amount of the flow rate (e.g., a component part of the set flow rate value whose order of magnitude is greater than or equal to 1-10 flow rate units) may be directed into the flow rate control unit whose control resolution lower, while a small amount of the flow rate (e.g., a component part of the set flow rate value whose order of magnitude is less than 1) may be directed into the flow rate control unit whose control resolution is high. In accordance with this arrangement, since the set flow rate distribution part distributes the set flow rate by order of magnitude to the flow rate control units according to the control resolution of each of the flow rate control units on a constant basis, it is possible to improve not only the accuracy of the total flow rate output from the output port but also the responsiveness of the control.

In addition, since it is possible to control the flow rate by flowing the fluid at the same time in two flow rate control units, it is possible to increase the maximum flow rate while maintaining the resolution of the flow rate control.

More specifically, it is possible for the present claimed invention to realize various flow rate control modes and enable densification and downsizing by providing a plurality of independent flow rate control units to a single basal plate block.

Furthermore, the operation unit decision part may judge which flow rate control unit receives the set flow rate value by the user.

Figure 8:
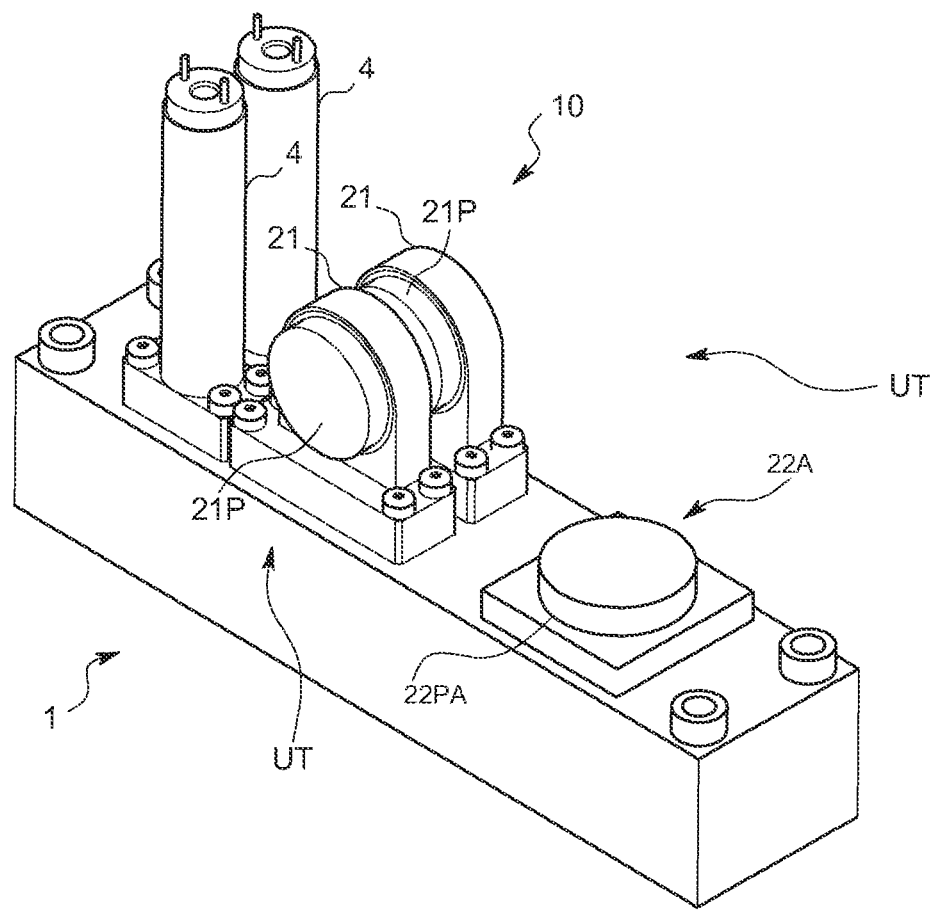
FIG. 8 is a schematic perspective view of a flow rate control device in accordance with a further different embodiment of this invention.
Figure 9:
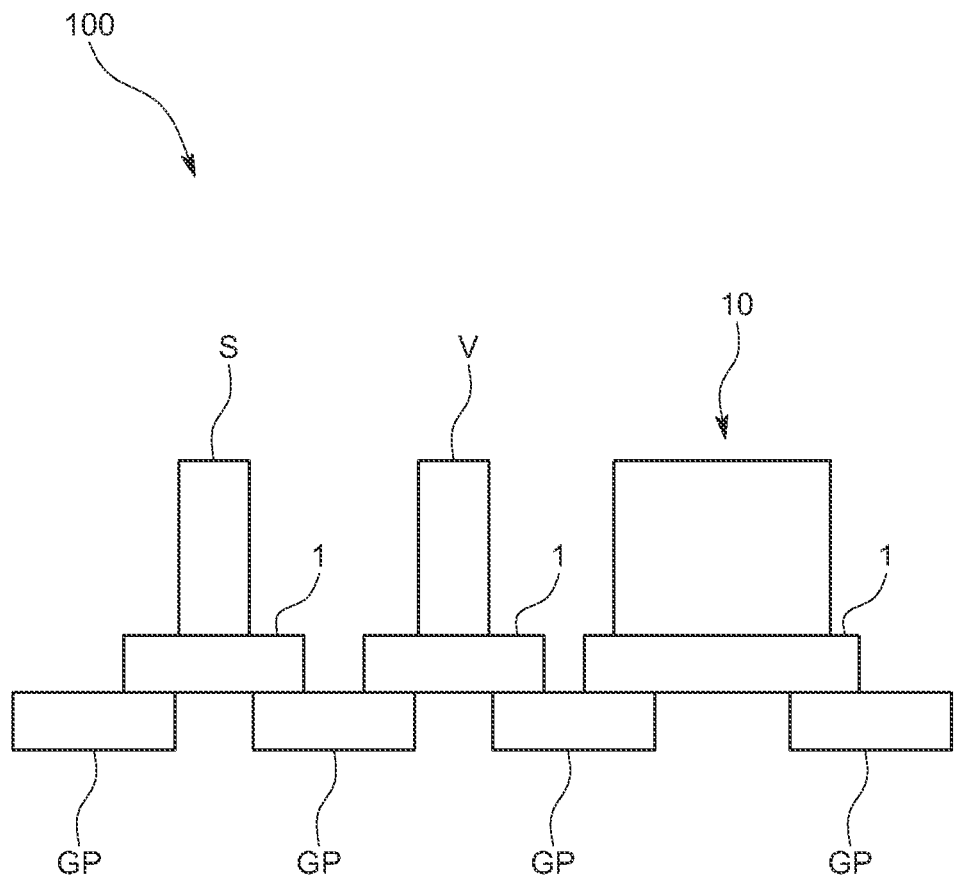
FIG. 9 is a conceptual diagram of a gas panel system.

Furthermore, although each of the second pressure sensors is located downstream of the laminar flow elements respectively in the above-mentioned embodiment, a single second pressure sensor may be shared as shown in FIG. 8. This is because the flow channel from the output port to each laminar flow element is connected and there would be almost no difference in the pressure so that the pressure in one of the internal flow channels can be used as a measure of the pressure in each of the internal flow channels. In the case of sharing the second pressure sensor, the pressure sensor whose conventional pressure sensitive surface is parallel to the mounting surface is arranged to cover almost the width directional length of the mounting surface as shown in FIG. 8 and measures the pressure in the downstream side of either one of the laminar flow elements. In the case where the vertically placed pressure sensor whose pressure sensitive surface is oriented vertically relative to the mounting surface as shown in FIG. 2, a fluid block located between the mounting surface and the pressure sensitive surface becomes necessary so that a manufacturing cost increases in proportion to a labor of maintaining the high processing accuracy by conducting a grinding process or the like. On the other hand, in the case where a shared pressure sensor is mounted on the mounting surface parallel to the mounting surface, since there is no need of a member corresponding to the above-mentioned fluid block, a manufacturing cost is further reduced, in addition to the possible reductions in cost of manufacturing the flow rate control device due to sharing the component (e.g., a shared pressure sensor).

In addition, in the case where the flow rate control valve is located downstream of each of the pressure sensors and the laminar flow element, the pressure sensor located at the upstream side of the laminar flow channel may be shared. In this case also, since the internal flow channel from the input port is connected to each of the laminar flow channels, the pressure in any position in the internal flow channel from the input port is generally the same.

Furthermore, the flow rate control unit is arranged on the basal plate block in the above-mentioned embodiment, however, for example, a pressure control unit may be arranged thereon instead. The pressure control unit can be represented by a pressure control unit comprising a pressure sensor, a pressure control valve and a valve control part that controls an open degree of the pressure control valve so as to make the measured pressure value measured by the pressure sensor to be the set pressure value. The pressure control unit may be provided with the pressure sensor and the pressure control valve in this order from the upstream side, or conversely the pressure control valve and the pressure sensor are provided in this order from the upstream side.

Furthermore, in addition to a method where the information processing circuit automatically determines how the flow rate control is conducted by the flow rate control unit, the user may manually set the set flow rate value directly to each of the flow rate control units.

The present claimed invention is not limited to the above-mentioned embodiments and may be variously modified without departing from a spirit of the invention.

INDUSTRIAL APPLICABILITY

The present claimed invention can be used for a gas panel system used in a semiconductor manufacturing line, and makes it possible to improve a flow rate control performance while easing updates to process equipment by standardizing the size of a flow rate control device from a plane view.

The invention claimed is:

1. A flow rate control device comprising
   a basal plate block having a substantially rectangular mounting surface including short sides and long sides, wherein the short sides are shorter than the long sides;
   a single input port into which a fluid flows, wherein the single input port opens on an outer surface of the basal plate block;
   a single output port from which the fluid flows out, wherein the single output port opens on the outer surface of the basal plate block;
   two inflow channels whose proximal ends are connected to the input port, wherein the two inflow channels are formed inside of the basal plate block;
   two outflow channels whose terminal ends are connected to the output port, wherein the two outflow channels are formed inside of the basal plate block; and
   two flow rate control units arranged on the substantially rectangular mounting surface of the basal plate block, wherein
   each of the two flow rate control units comprises:
     a flow rate sensor, and
     a flow rate control valve which is feed-back controlled based on the output of the flow rate sensor,
   one of the flow rate control units is arranged between one of the inflow channels and one of the outflow channels, the other flow rate control unit is arranged between the other inflow channel and the other outflow channel, and each of the flow rate control units is configured to be capable of operating independently to control a flow rate, and
   as viewed from a direction perpendicular to the mounting surface, each of the two inflow channels diagonally leads from the single input port toward either long side of the mounting surface and each of the two outflow channels diagonally leads from the either long side of the mounting surface to the single output port.

2. The flow rate control device described in claim 1, wherein
   in a case where a flow rate of the fluid is controlled by one of the flow rate control units, the basal plate block and two flow rate control units are configured so that the fluid does not flow to the output port from the input port through the other flow rate control unit.

3. The flow rate control device described in claim 1, wherein a size in a short direction of the mounting surface of the basal plate block is set to be generally identical to an outer size of a reference pressure sensor whose pressure sensitive surface is mounted parallel to the mounting surface, the mounting surface having a substantially rectangular shape on which the flow rate control units are mounted,
   each of the flow rate control units comprises a pressure sensor whose pressure sensitive surface is mounted vertically relative to the mounting surface respectively, and
   each of the pressure sensors is mounted on the mounting surface in parallel and side by side in the short direction.

4. The flow rate control device described in claim 1, wherein
   a flow rate control characteristic of each flow rate control unit differs, and further comprising
   an operation unit decision part that determines which flow rate control unit conducts the flow rate control according to an input set flow rate value.

5. The flow rate control device described in claim 4, wherein
   each of the flow rate control units comprises the flow rate control valve, the flow rate sensor, and a valve control part that controls an open degree of the flow rate control valve so as to decrease a deviation between a measured flow rate value measured by the flow rate sensor and the input set flow rate value,
   a flow rate controllable range of each of the flow rate control units differs, and
   the operation unit decision part is configured both to decide that the flow rate control unit whose flow rate controllable range includes the input set flow rate value is to conduct the flow rate control, and to fully close the flow rate control valve of the flow rate control unit that does not conduct the flow rate control.

* * * * *